US012776215B2

(12) United States Patent
(10) Patent No.: US 12,776,215 B2
(45) Date of Patent: Oct. 27, 2026

Wojdylo et al.

(54) SYSTEM AND METHOD FOR MANAGING PARKING OF VEHICLES

(71) Applicant: Stellos AG, Zurich (CH)

(72) Inventors: Mateusz Wojdylo, Zurich (CH); Pawel Gorzelewski, Wroclaw (PL)

(73) Assignee: Stellos AG, Zurich (CH)

( * ) Notice: Subject to any disclaimer, the term of this patent is extended or adjusted under 35 U.S.C. 154(b) by 214 days.

(21) Appl. No.: 18/564,942

(22) PCT Filed: Jun. 1, 2022

(86) PCT No.: PCT/IB2022/055126

§ 371 (c)(1),
(2) Date: Nov. 28, 2023

(87) PCT Pub. No.: WO2022/254360

PCT Pub. Date: Dec. 8, 2022

(65) Prior Publication Data

US 2024/0265808 A1 Aug. 8, 2024

(30) Foreign Application Priority Data

Jun. 2, 2021 (GB) ...................................... 2107892

(51) Int. Cl.
*G08G 1/14* (2006.01)
*B60W 30/06* (2006.01)
(Continued)

(52) U.S. Cl.
CPC ............. *G08G 1/149* (2013.01); *B60W 30/06* (2013.01); *G06Q 10/02* (2013.01); *G06V 20/52* (2022.01);
(Continued)

(58) Field of Classification Search
CPC ....... G08G 1/149; G08G 1/146; B60W 30/06; G06Q 10/02; G06V 20/52; G06V 20/625;
(Continued)

(56) References Cited

U.S. PATENT DOCUMENTS 9,990,850 B2 * 6/2018 Wauldron .............. G08G 1/205
10,769,949 B2 * 9/2020 Edwards ................ G08G 1/143
(Continued)

FOREIGN PATENT DOCUMENTS

CN 106997683 A 8/2017
CN 107123304 A 9/2017
(Continued)

OTHER PUBLICATIONS

United Kingdom Intellectual Property Office, Combined Search and Examination Report under Sections 17 and 18(3), Application No. GB2107892.8, issued on Nov. 30, 2021, 09 Pages.
(Continued)

*Primary Examiner* — Daryl C Pope
(74) *Attorney, Agent, or Firm* — Ziegler IP Law Group, LLC.

(57) ABSTRACT

Disclosed is a system for managing parking of vehicles including: a user application configured to allow a user to search for a plurality of parking spaces in an area and reserve a parking space for a vehicle based on a selectable criteria and a remotely operable device, installed at the parking space, configured to communicate with an access controller connected to a barrier to restrict unauthorised access to the parking space, wherein the remotely operable device is further configured to communicate with a remote server and/or the user application to receive a command to open the barrier so that the vehicle can be parked at the reserved parking space.

14 Claims, 3 Drawing Sheets

(51) Int. Cl.

| | |
|---|---|
| ***G06Q 10/02*** | (2012.01) |
| ***G06V 20/52*** | (2022.01) |
| ***G06V 20/62*** | (2022.01) |
| ***G06V 40/16*** | (2022.01) |
| ***G07B 15/04*** | (2006.01) |
| ***G07C 9/10*** | (2020.01) |
| ***G07F 15/00*** | (2006.01) |

(52) U.S. Cl.
CPC .......... *G06V 20/625* (2022.01); *G06V 40/172* (2022.01); *G07B 15/04* (2013.01); *G07C 9/10* (2020.01); *G07F 15/005* (2013.01); *G08G 1/146* (2013.01); *G06V 2201/08* (2022.01)

(58) Field of Classification Search
CPC .. G06V 40/172; G06V 2201/08; G07B 15/04; G07B 15/02; G07C 9/10; G07F 15/005; B60L 53/126; B60L 53/66; B60L 53/68
See application file for complete search history.

(56) References Cited

U.S. PATENT DOCUMENTS

| | | | | |
|---|---|---|---|---|
| 10,964,215 | B1 * | 3/2021 | Papineau | G06Q 30/0207 |
| 2008/0263147 | A1 | 10/2008 | Ponert et al. | |
| 2021/0295610 | A1 * | 9/2021 | Lee | G06Q 20/145 |
| 2021/0394636 | A1 * | 12/2021 | Meyer | B60L 53/65 |

FOREIGN PATENT DOCUMENTS

| | | | |
|---|---|---|---|
| CN | 110503852 | A | 11/2019 |
| CN | 110533949 | A | 12/2019 |
| CN | 111429747 | A | 7/2020 |
| CN | 112017363 | A | 12/2020 |
| CN | 112172593 | A | 1/2021 |
| CN | 112184930 | A | 1/2021 |
| EP | 3605495 | A1 | 2/2020 |
| KR | 101211374 | B1 | 12/2012 |

OTHER PUBLICATIONS

United Kingdom Intellectual Property Office, Examination Report under Section 18(3), Application No. GB2107892.8, issued on Dec. 13, 2023, 05 Pages.

European Patent Office, International Preliminary report on Patentability, Application No. PCT/IB2022/055126, issued on Dec. 14, 2023, 08 Pages.

European Patent Office, International Search Report and Written Opinion, Application No. PCT/IB2022/055126, issued on Sep. 27, 2022, 12 Pages.

European Patent Office, International Search Report, International Application No. PCT/IB2022/055126, dated Sep. 27, 2022, 2 pages.

* cited by examiner

SYSTEM AND METHOD FOR MANAGING PARKING OF VEHICLES

TECHNICAL FIELD

The present disclosure relates to parking management; and more specifically to systems and methods for managing parking of vehicles.

BACKGROUND

The number of vehicles throughout the world have grown exponentially. However, the availability of public parking spaces for those vehicles is limited, and the increasing number of vehicles to be parked is creating a demand for more and more parking spaces. Generally, vehicular parking is provided as a secondary convenience, making parking a finite public resource. In the urban environment, local governments typically regulate parking on public road shoulders, municipal parking spaces, and other public land with a regulatory program that provides revenue and promotes both public safety and public health. Non-public (Private) parking spaces such as curb cuts in front of private roads, residences and other structures do not have any means to provide a simple indication of when these parking spaces can be used by the public. Further, small businesses have parking lots that remain empty except during normal business hours, resulting in a large number of vacant spaces that may be utilized by other vehicle drivers (such as private car drivers) if available. Such constraints inhibit a commuter to efficiently manage their parking needs, and thus results in stress before or during their journey.

Moreover, parking a vehicle, especially in urban areas, can be time consuming and stressful. Two scenarios are typical: a vehicle that is parked in the same parking facility often (e.g., a vehicle parked by a commuter who works in an office building near the parking facility) and a vehicle that is parked infrequently or only once in a parking facility (e.g., a vehicle parked by a commuter to run an errand, visit a facility, or attend an event in the vicinity of the parking facility). Each of these scenarios may result in various inefficiencies. The commuter parking the vehicle frequently may have a leased parking space that periodically, such as on nights, vacations, weekends, and holidays, remains vacant. The commuter parking the vehicle infrequently may have difficulty in finding a parking facility with available parking spaces and/or finding a parking facility with acceptable parking rates.

Cities, airports, and other governmental and private companies use some known techniques to manage parking. These techniques often are utilized to reduce the time needed for a person to find a parking spot and to increase utilization of the parking facilities. For example, some airports and cities may indicate which parking lots or facilities are full and which parking lots have parking spaces available. This reduces the amount of time that drivers spend looking for parking spaces, thereby saving time and fuel. Such systems require monitoring of parking availability and occupancy through a variety of means including manually observing and entering such information, by using parking control devices that count the number of vehicles entering and leaving a parking facility, or by using other automated methods. However, the said techniques are inefficient and cannot be used for managing private and small parking spaces.

Therefore, in light of the foregoing discussion, there exists a need to overcome the aforementioned drawbacks and provide an improved system or method for managing parking of vehicles.

SUMMARY OF THE INVENTION

The present disclosure seeks to provide a system and a method for managing parking of vehicles. An aim of the present disclosure is to provide a solution that overcomes at least partially the problems encountered in prior art.

In one aspect, the present disclosure provides a system for managing parking of vehicles comprising:

- a user application configured to allow a user to search for a plurality of parking spaces in an area and reserve a parking space for a vehicle based on a selectable criteria; and
- a remotely operable device, installed at the parking space, configured to communicate with an access controller connected to a barrier to restrict unauthorised access to the parking space, wherein the device is further configured to communicate with a remote server and/or the user application to receive a command to open the barrier so that the vehicle can be parked at the reserved parking space.

Excessive greenhouse emissions from automobiles causes a significant negative impact on the environment. To overcome the aforementioned problem, the present disclosure provides a system that may be integrated with existing municipal transportation systems to allow provision of an increased number of parking spaces that are cheaper and an environment friendly alternative to the traditional 'Park & Ride' solution. Further, such an integration allows users (or commuters) to plan their whole trip or journey including parking spot reservation and access to the city bus/trams/trains routes and timetables, thereby increasing the usage of public transportation and consequently reducing the amount of traffic in the area. Furthermore, users (parking space owners) are enabled to earn from vacant parking spaces and at the same time help reducing greenhouse emissions in the environment. Moreover, since the communication between various system components is handled via command signals such as, but not limited to, sent via text messages or packet data transmissions utilizing existing infrastructure of mobile network operators. Beneficially, such an integration of the vast coverage of existing mobile networks (especially in the city areas where private and condominium parking are located), makes the system more reliable (since, carrier grade mobile network operators provide over 99.99% percent connection uptime), simple and relatively cheaper since there is no need to build or extend any network infrastructure). Additionally, due to the fact that the entire communication only takes place between the system components and the user (or user mobile network), it makes the system reliable and less vulnerable to any malicious attacks.

In another aspect, the present disclosure provides a method of managing parking of vehicles comprising the steps of:

- allowing a user to search for a plurality of parking spaces in an area and reserving a parking space to park a vehicle based on a selectable criteria;
- remotely controlling an access controller connected to a barrier to restrict an unauthorised access to the parking space; and
- sending a command to trigger the access controller to open the barrier upon user activation.

Embodiments of the present disclosure substantially eliminate or at least partially address the aforementioned problems in the prior art and enable the system or method managing parking of vehicles.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings.

For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Figure 1:
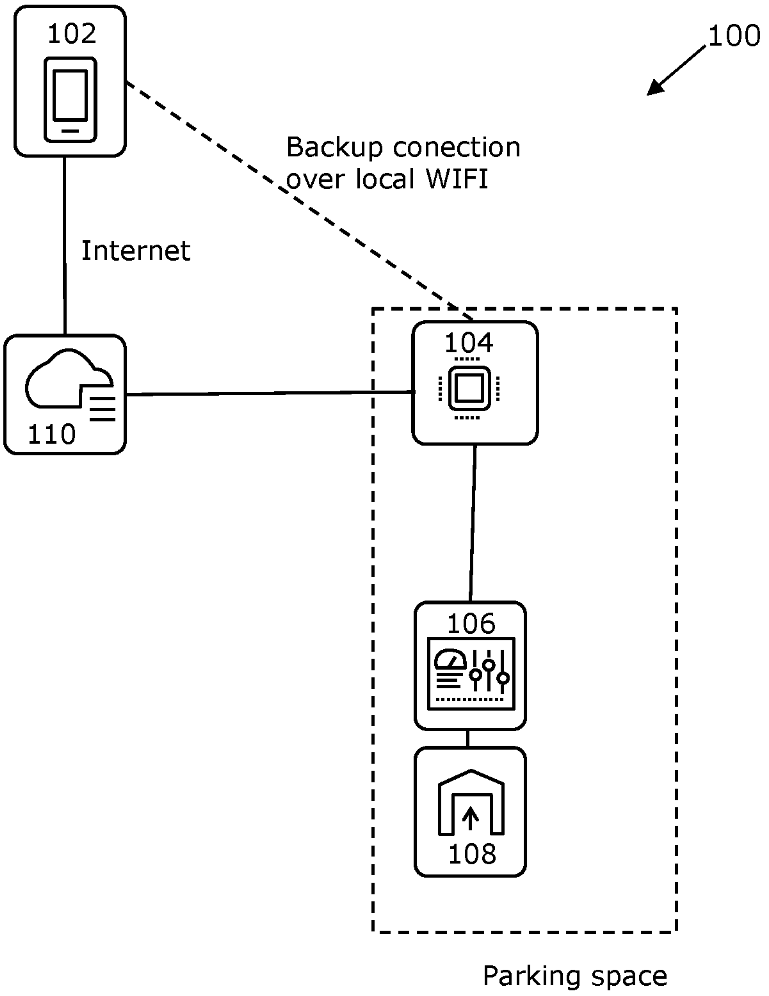
Figure 2:
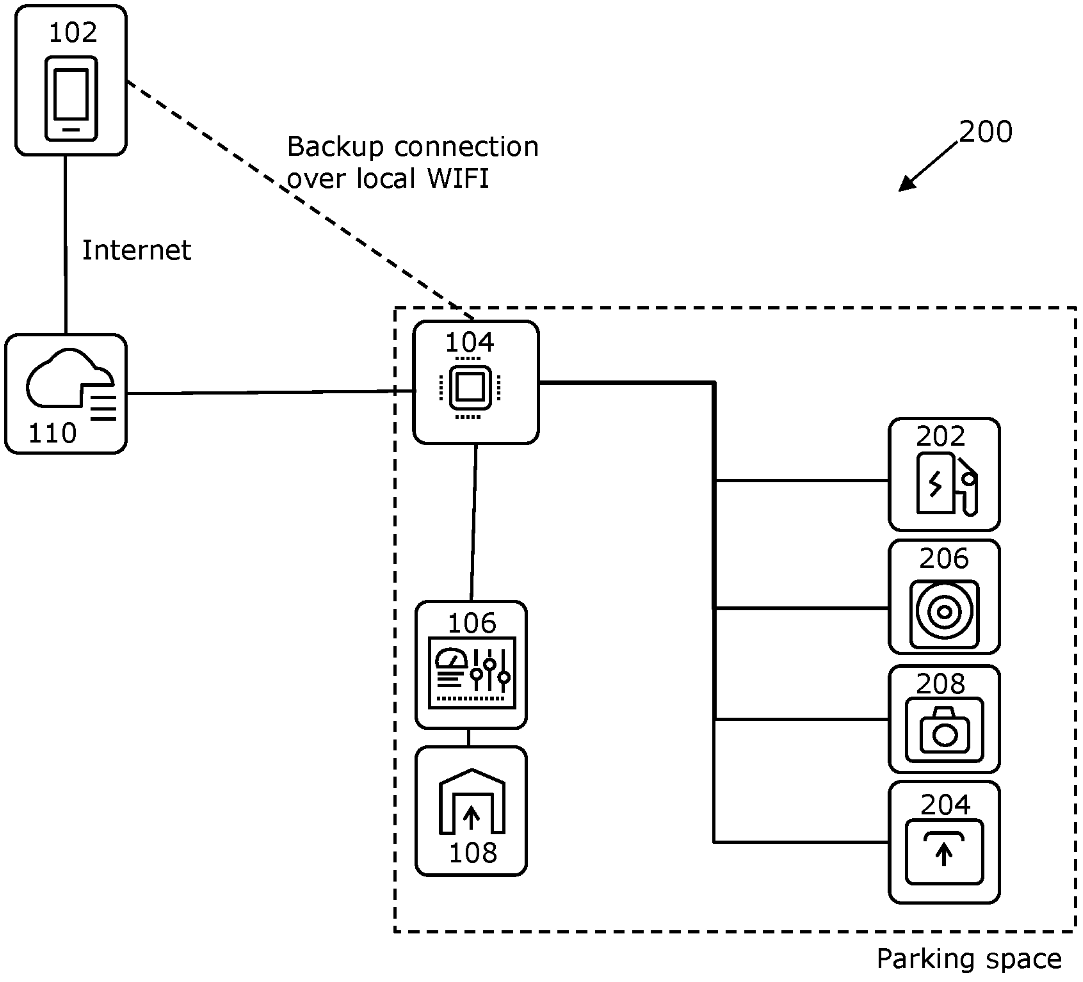
Figure 3:
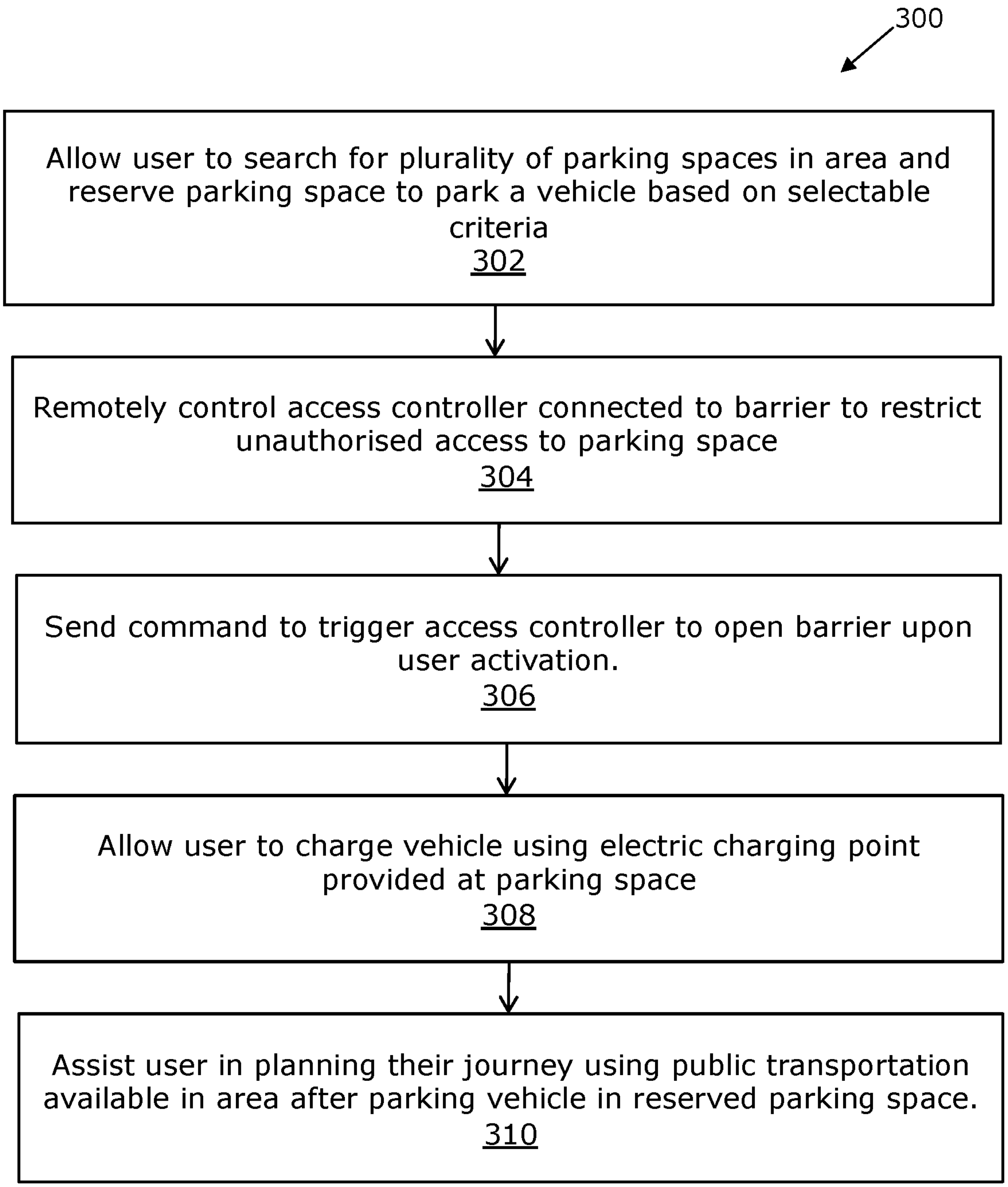

Embodiments of the present disclosure will now be described, by way of example only, with reference to the following diagrams wherein:

FIG. 1 is a schematic diagram of a system for managing parking of vehicles, in accordance with an embodiment of the present disclosure;

FIG. 2 is a schematic diagram of a system for managing parking of vehicles, in accordance with another embodiment of the present disclosure;

FIG. 3 is a flowchart of a method for managing parking of vehicles, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates various aspects of the present disclosure and ways in which they can be implemented. Although some modes of carrying out the present disclosure have been disclosed, those skilled in the art would recognize that other embodiments for carrying out or practising the present disclosure are also possible.

The present disclosure provides a system for managing parking of vehicles. Typically, the system for managing parking of vehicles is a sustainable mobility solution for implementation in both urban and rural areas, but particularly in the cities and metropolitan areas (i.e., areas with relatively higher traffic) for effectively managing and simplifying transportation for commuters (or users). The term "managing" refers to the various tasks involved in the system such as, but not limited to, collection of data, registration of parking spaces, booking of parking transactions, and assistance during journey provided by the system to a user looking for a parking space. Throughout the present disclosure, the term "parking space" refers to a single parking spot, a plurality of parking spots in an area, or other parking arrangements. Generally, a commuter is required to park their automobile at specific parking locations (distant from their target destination) that are not widely available and thus the commuter may be required to switch to public transport to complete the journey. The system enables such commuters to park their vehicles in a variety of locations, such as residential areas, shared by private owners with the commuters. The commuters can select a parking space from an extended parking database including a variety of parking spaces at different locations, apart from the existing public and private parking outlets. This reduces the amount of time, money and resources required for the journey.

Notably, the system for managing parking of vehicles may be integrated with existing parking management systems or deployed in parking places that are operated without any such systems (e.g., private or condominium parking spots/garages). It is desired to reduce the "cruising for parking" phenomenon that is responsible for causing between 20% to 70% of traffic and consequently result in generation of excessive $CO_2$ emission and causing a negative impact on the environment. To overcome the aforementioned problem, the system may be integrated with existing municipal transportation systems allowing the system for managing parking of vehicles to provide parking spaces as a cheaper and environment friendly alternative for the traditional 'Park & Ride' solution. Beneficially, such an integration allows the users to plan their whole trip or journey including parking spot reservation and access to the city bus/trams/trains routes and timetables, thereby increasing the usage of public transportation and consequently reducing the amount of traffic in the area.

The system for managing parking of vehicles comprises a user application configured to allow a user to search for a plurality of parking spaces in an area and reserve a parking space for a vehicle based on a selectable criteria. The term "user application" refers to one or more of a web application, a mobile application, or any such interface configured to allow the user to search for and reserve parking spaces as well as for other purposes as explained further. The system comprises a parking space database comprising the plurality of parking spaces i.e., the records of all the available parking spaces, including the parking spaces registered by parking space owners on the user application and/or the existing public and private parking spaces. The user application is configured to allow a user to freely manage parking spaces (from a parking space owner's perspective) as well as to book parking spaces (from the commuter perspective). Further, the user application also allows the user to pay for a parking transaction in a quick and efficient manner. In the present disclosure, the term "parking transaction" refers to the booking of the parking space by a user, or optionally booking of an energy charging transaction for electric vehicles.

Herein, the user is a commuter (such as a driver). The user employs the user application to search for available parking spaces from the parking spaces database. The user application allows the user to filter existing parking spaces in the database based on the selectable criteria. The term "selectable criteria" refers to different availability conditions of the parking spaces. The selectable criteria comprise at least one of a size of parking space, the type of parking space (such as underground or overground), parking space availability and/or timings, associated parking charges and so forth.

Further, the user application allows the user to make a reservation for any available parking space.

Furthermore, the user application allows the users to remotely open garage doors by employing either a mobile phone or a remotely operated device only. The user application is configured to track and manage the parking transaction and associated charges and payments for using the parking space or an EV charging station. It is to be understood that any reference to an EV charging station or a charging point throughout this disclosure includes dedicated purpose-built charging points, regular electric sockets, and any other suitable means for charging electric vehicles. Furthermore, the user application may be integrated with public transport systems and timetables to allow the users to plan and manage their journey including parking spot reservation and public transport tickets and/or assistance. Notably, the user application allows the users to manage the parking transaction using the user application and accordingly pay for the parking transaction (i.e., the parking space booking and/or charging) in an efficient manner while saving time and resources.

In an exemplary scenario, the user employs the user application to search for a free parking spot on an interactive map (such as, Google Maps™), wherein based on the required location, the user may navigate the interactive map to find a desired parking space.

In an embodiment, the user application is further configured to allow owners of the plurality of parking spaces to list their available parking spaces to be reserved by other users searching for parking spaces through the user application. A parking owner uses the user application to add or register their own parking space and provide information such as the type of parking space, availability timings or schedule, parking charges, available parking space capacity or size, and so forth.

In another embodiment, a charging station owner uses the user application to add electric charging stations and provide information such as availability of parking/charging space, availability timings or schedule, parking charges, charging costs, charging station capacity, and if available, associated information regarding the parking space. It is to be noted that the parking owner and the charging station owner may be the same entity.

The system comprises a remotely operable device, installed at the parking space, configured to communicate with an access controller connected to a barrier to restrict unauthorized access to the parking space. The remotely operable device is configured to verify or authenticate the user and upon successful verification transmit a control signal to switch the barrier located at the parking spaces to allow the user to access the parking space. Herein, the device is further configured to communicate with a remote server and/or the user application to receive a command to open the barrier so that the vehicle can be parked at the reserved parking space. Notably, the user application enables the user to access the barrier using the user application upon successful booking and payment related to the parking space.

Herein, the 'remotely operable device' refers to a structure and/or module that includes programmable and/or non-programmable components configured to store, process and/or share information and/or signals relating to the parking transaction. The remotely operable device may be a controller having elements, such as a display, control buttons or joysticks, processors, memory and the like. For example, the remotely operable device may be a portable computing device having one or more buttons operable to be pressed to generate a control signal. In some examples, the remotely operable device comprises at least one of a hardware button or a virtual button. Typically, the remotely operable device is operable to control movement of the barrier at the parking space or charging station upon successful verification and/or authentication and/or payment associated to the parking space. Optionally, the remotely operable device comprises one or more embedded and/or external devices such as a GPS system, a microphone, a speaker, one or more transmitters, one or more sensors or a sensor arrangement.

In the present examples, the remotely operable device may include components such as memory, a processor, a network adapter and the like, to store, process and/or share information with other computing components, such as a user device, a remote server unit, a database arrangement, existing parking management systems and so forth. Optionally, the remotely operable device communicates with EV charging station meters and optional parking spot sensors inside the parking space. Beneficially, the remotely operable device is based on a single device and does not require any additional "beacons", "relays" or short-range communication units for gate/barrier opening, and thus reduces the associated costs of the system and at the same time makes the system more reliable and convenient for installation and further maintenance. Additionally, due to the fact that the entire communication only takes place between the system (or remotely operable device) and user (or user mobile network), it makes the system less vulnerable to any malicious attacks.

Generally, a vast majority (approximately 96%) of parking or garage gate controllers have dedicated input ports to connect auxiliary devices (such as an exit button) to trigger the opening of a gate without utilizing a remote controller. In an example, the gate may be triggered to open by a short-circuit of the internal circuit. The remotely operable device further comprises one or more relays for triggering garage gate/barrier opening. Beneficially, the one or more relays are provided at different locations to ensure a smooth triggering operation from any location of the parking space.

In an embodiment, the remotely operable device is further configured to establish a wireless local area network that can be detected by the user application and enable the user application to open the barrier without requiring connection to the remote server. Typically, the remotely operable device provides a wireless local area network that can be detected and accessed by the user via the user application. This could be used for gate or barrier opening in a situation wherein a working cellular internet connection is not available (which is common in underground garages) to ensure a smooth and efficient operation.

The "remote server" refers to a structure and/or module that includes programmable and/or non-programmable components configured to store, process and/or share information or data for managing the parking of vehicles. Optionally, the remote server includes any arrangement of physical or virtual computational entities capable of enhancing information to perform various computational tasks. Furthermore, it will be appreciated that the remote server may be implemented as a hardware server and/or plurality of hardware servers operating in a parallel or in a distributed architecture. Optionally, the remote server is supplemented with additional computation system, such as neural networks, and hierarchical clusters of pseudo-analog variable state machines implementing artificial intelligence algorithms. In an example, the remote server may include components such as a memory, a processor, a data communication interface, a network adapter and the like, to store, process and/or share information with other computing devices, such as the remotely operable device, the user application, the energy meter etc. Optionally, the remote server is implemented as a computer program that provides various services (such as database service) to other devices, modules or apparatus. Moreover, the remote server refers to a computational element that is operable to respond to and processes instructions to perform the data access transactions. Optionally, the remote server includes, but is not limited to, a microprocessor, a microcontroller, a complex instruction set computing (CISC) microprocessor, a reduced instruction set (RISC) microprocessor, a very long instruction word (VLIW) microprocessor, Field Programmable Gate Array (FPGA) or any other type of processing circuit, for example as aforementioned. Additionally, the remote server is arranged in various architectures for responding to and processing the instructions for managing the parking of vehicles via the system.

In an embodiment, the system further comprises an energy meter associated with an electric charging point provided at the parking space, wherein the electric energy meter is configured to communicate with at least one of the remotely operable device, the user application, and the remote server to allow the user to charge the vehicle while it is parked at the reserved parking space. This is applicable for cases where the parking space comprises electrical charging station(s) configured to provide electrical energy to charge electric vehicles (EV). Typically, the parking space includes the electric charging point i.e., the slot for connecting the EV to the charging station. The electric energy meter is configured to track and display the units of electrical energy consumed by the user's EV during charging. Thus, the system also supports for EV charging that is crucial for increase of usability and popularity of electric vehicles that are environment friendly and aid in reducing the amount of greenhouse emissions into the environment.

Beneficially, EV charging provides an eco-friendly and sustainable alternative with respect to the conventional fossil fuel powered vehicles. However, the support infrastructure for EV charging systems is not widely available in existing parking management systems and thus the system enables the integration of all the aforementioned functions into the single system for managing parking vehicles. It also enables the integration of EV charging stations with the existing parking management systems. Alternatively stated, the system enables full integration with any type of the conventional EV chargers and allow for simple and quick payments for parking spot usage and EV charging (if applicable for any certain user). Furthermore, the energy meter is configured to allow switching of the EV charger (ON/OFF) and at the same time, measure the amount of energy used for EV charging. Beneficially, the energy meters comprise energy stabilizers and modulators to provide security to the user and/or vehicle due to any power grid failures (e.g., power surges). Optionally, the electric energy meters and the electric charging points are equipped with Wi-Fi and Powerline technology configured to provide a communication (Wi-Fi) network over the entire parking space.

In operation, the electric energy meter is configured to communicate with at least one of the remotely operable device, the user application, and the remote server to allow the user to charge the vehicle while it is parked at the reserved parking space. Typically, the user application is configured to track parking usage by a user and correspondingly charge the user for the parking space as well as for using the electric charging point at the parking space. The user application may be configured to close the barrier/garage door at the parking space until the payment for the parking is completed by the user. Upon successful payment, the user application enables the user to remotely control the barrier using the user application. For this purpose, the remotely operable device and the electric energy meter are configured to communicate with the user application and other devices in the system.

Notably, the remotely operable device, the user application, the energy meter and the barrier are communicably coupled via a communication interface. Beneficially, such an integration of the system components i.e., the user application, electric charging stations with the existing public transportation means significantly reduce the amount of vehicular traffic and associated CO2 emissions, and thus makes the system eco-friendly and sustainable.

Herein, the communication interface includes a medium (e.g., a communication channel) through which the system components communicate with each other. Examples of the communication interface include, but are not limited to, a communication channel in a computer cluster, a Local Area Communication channel (LAN), a cellular communication channel, a wireless sensor communication channel (WSN), a cloud communication channel, a vehicle-to-communication channel (V2N) communication channel, a Metropolitan Area Communication channel (MAN), and/or the Internet. The communication interface may comprise one or more of a wired connection, a wireless network such as Bluetooth, Wi-Fi, LoRa, cellular networks such as 2G, 3G, 4G, 5G mobile networks, and a Zigbee connection, and other similar communication technologies.

In an embodiment, the system further comprises one or more sensors installed at the parking space to monitor the vehicles accessing the parking space. The term 'one or more sensors' refers to a group of sensors used for collecting information relating to the parking space, user and/or vehicle. The one or more sensors are placed at each parking space of the plurality of parking spaces to enable the system to accurately determine the number of available parking spaces. Typically, the one or more sensors are configured to determine the availability of each parking space of the plurality of parking spaces and enable the user application communicably coupled to the one or more sensors to display the available parking spaces to the user. The parking spaces may be represented in any form including, but not limited to, a list, a grid, a map, a database, a chart and so forth.

In some embodiments, the one or more sensors comprises a motion detector, an infrared reflectance sensor, and a magnetometer. In general, the one or more sensors are selected from at least one of a proximity sensor, a motion sensor, a light sensor, an accelerometer, a gyroscope sensor, a motion sensor. The system employs the one or more sensors to analyse the situation of the user using one or more cameras to enable the system to coordinate and/or interact with the user. The 'imaging device' refers to a mechanical, digital, or electronic viewing device such as a camera, camcorder, motion picture camera, or any other instrument, equipment, or format capable of recording, storing, or transmitting visual images.

In another embodiment, the system further comprises one or more cameras installed at the parking space to capture information such as vehicle type, model, colour, license plate number of the vehicle entering the parking space, and to track people entering and exiting the parking space. The system comprises the one or more cameras operatively coupled to the one or more sensors for managing the parking of vehicles. The one or more cameras also includes an imaging software for processing the captured visual information. Herein, the system employs the one or more cameras to recognize and differentiate different sizes, shapes, textures, appearances, colours and conditions of the user and/or vehicle. The system determines the characteristic information obtained using the one or more cameras enabled with an imaging software. In an example, the one or more cameras consists of an RGB-D camera enabled with a developed machine learning algorithm to make use of the colour and depth sensing capabilities of the RGB-D camera to detect the type, colour, size and so forth of the vehicle.

In an exemplary embodiment, the system may receive information regarding a plurality of parking spaces from an existing parking database or system, wherein the information for each parking space comprises: number of available parking spaces, type of parking space (i.e. with or without electric charging station) and a location. The system may further receive from the user, via the user application at least one of a personal user information (such as recent images, name, government ID, social security number and so forth), a vehicle identifier (such as the license plate number, vehicle type, etc.) to identify the user and/or the vehicle. The system may create a user account linked with the user, the associated vehicle identifier, and the vehicle, such that the user application could bill parking charges to the user for utilizing the parking space. If the vehicle identifier is not provided by the user, the system employs the one or more cameras to capture information such as vehicle type, model, colour, license plate number of the vehicle entering the parking space, and to track people entering and exiting the parking space using biometrics such as facial recognition.

In an embodiment, the system may comprise a dynamic display, located at the plurality of parking places, linked with the system, wherein the dynamic display is configured to display information related to the parking transaction or optionally, advertisements based on parking characteristics of the vehicle when the user is expected to be in the vicinity of the dynamic display.

In some examples, the parking space may be simply tagged. However, the tag may be difficult to see at night. Alternatively, the parking system may comprise a parking indicator, for example, a display or a combination of lights to attract the attention of a guest looking for the parking space. Generally, the system assists or guides the user to the destination via a map and, in addition, GPS coordinates for the map space, to guide the user to the parking space and/or destination. Optionally, the system comprises generating an alert for the user upon reaching near the parking space or destination by sending a signal to the user application or the user device or the vehicle.

In an embodiment, the user application further comprises information regarding public transportation in the area and is configured to assist the user in planning their journey using the public transportation after parking the vehicle at the reserved parking space. The system comprises aiding or helping a user find a reserved parking space and assist the user in planning their subsequent journey using the public transportation after parking the vehicle at the reserved parking space. In an exemplary scenario, the system comprises the user application comprising information regarding train, bus and other public transport schedules, and the system provides the information based on an input destination from the user.

In an embodiment, the system further comprises one or more modules configured to enable autonomous parking of the vehicles. In addition, the system comprises a ZigBee transceiver configured to enable integration of the system with a variety of IoT devices from simple parking spot occupancy sensors up to electric energy meters and EV chargers to enable autonomous parking of the vehicles. Typically, in such an arrangement, the user is not required to operate the user application and/or the remotely operable device to park their vehicle at their parking spot. Herein, the system comprises a fully automated machine learning or artificial intelligence algorithm configured to manage the parking of the vehicle autonomously by means of the one or more sensors, the one or more cameras placed at the parking spaces. The one or more sensors and cameras communicably coupled to the system provide information related to the user and/or user vehicle required for parking the vehicle. In an example, the system comprising the motion detector which detects a presence of the user and/or the user vehicle at the parking space and employs the camera to identify characteristic information related to the user and the vehicle. Upon identifying the information, the system automatically opens the barrier (if any) to the parking space to allow the user to park his/her vehicle. Upon completing usage of the parking space, the system further determines the parking and/or electrical charging costs incurred by the user based on one or more factors such as, but not limited to, time duration, time of day, date, type of parking transaction, amount of electrical energy consumed (if electrical charging station was used by the user) and so forth. Upon successful completion of the payment associated to the parking transaction, the system is configured to autonomously open the barrier or door for the user to exit.

The present disclosure also provides a method of managing parking of vehicles comprising the steps of: allowing a user to search for a plurality of parking spaces in an area and reserving a parking space to park a vehicle based on a selectable criteria, remotely controlling an access controller connected to a barrier to restrict an unauthorised access to the parking space; and sending a command to trigger the access controller to open the barrier upon user activation.

The present disclosure also provides a computer-readable storage medium comprising instructions which, when executed by a computer, cause the computer to carry out the steps of the method for managing parking of vehicles. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Referring to FIG. 1, illustrated is a schematic diagram of a system 100 for managing parking of vehicle, in accordance with an embodiment of the present disclosure. As shown, the system 100 comprises a user application 102 configured to allow a user to search for a plurality of parking spaces in an area and reserve a parking space for a vehicle based on a selectable criteria. Optionally, the user may register or add the parking space (in case the user is a parking space owner) using the user application 102. The system 100 further comprises a remotely operable device 104 installed at the parking space, configured to communicate with an access controller 106 connected to a barrier 108 to restrict unauthorised access to the parking space. Herein, the remotely operable device 104 is further configured to communicate with a remote server 110 and/or the user application 102 to receive a command to open the barrier 108 so that the vehicle can be parked at the reserved parking space. Typically, the remotely operable device 104 or the user application 102 is configured to transmit a control signal to the remote server 110, wherein the remote server 110 is configured to operate the barrier 108 to prevent or restrict unauthorised access by transmitting a control signal or command to the barrier 108.

Referring to FIG. 2, illustrated is a schematic diagram of a system 200 for managing parking of vehicles, in accordance with another embodiment of the present disclosure. As shown, the system 200 (similar to the system 100) comprises a user application 102 configured to allow a user to search for a plurality of parking spaces in an area and reserve a parking space for a vehicle based on a selectable criteria. The system 200 further comprises a remotely operable device 104 installed at the parking space, configured to communicate with an access controller 106 connected to a barrier 108 to restrict unauthorised access to the parking space. Herein, the remotely operable device 104 is further configured to communicate with a remote server 110 and/or the user application 102 to receive a command to open the barrier so that the vehicle can be parked at the reserved parking space. Additionally, the system 200 further comprises an electric energy meter 202 associated with an electric charging point 204 provided at the parking space, wherein the electric energy meter 204 is configured to communicate with at least one of the remotely operable device 104, the user application 102, and the remote server 110 to allow the user to charge the vehicle while it is parked at the reserved parking space. The energy meter 202 and the electric charging point 204 enable the user to use the parking space for charging the vehicle. Furthermore, the system 200 further comprises one or more sensors 206 installed at the parking space to monitor the vehicles accessing the parking space and one or more cameras 208 installed at the parking space to capture information such as vehicle type, model, colour, license plate number of the vehicle entering the parking space, and to track people entering and exiting the parking space.

Referring to FIG. 3, illustrated is a flowchart of a method 300 for managing parking of vehicles, in accordance with an embodiment of the present disclosure. As shown, the method 300 comprises steps 302, 304, 306, 308 and 310.

At step 302, the method 300 comprises allowing a user to search for a plurality of parking spaces in an area and reserving a parking space to park a vehicle based on a selectable criteria.

At step 304, the method 300 comprises remotely controlling an access controller connected to a barrier to restrict an unauthorised access to the parking space. The method 300 comprises employing the remotely operable device to control the access controller connected to the barrier.

At step 306, the method 300 comprises sending a command to trigger the access controller to open the barrier upon user activation. That is, upon successful authorization and/or payment for the parking space, the method 300 comprises sending the command to trigger the access controller to open the barrier. Optionally, the user may employ the user application to control the access controller for opening/closing the barrier to the parking space.

Optionally, at step 308, the method 300 comprises allowing the user to charge the vehicle using an electric charging point provided at the parking space. The method 300 further allows the user to charge the vehicle using the electric charging point, wherein the electric charging point operatively coupled to the energy charging meter for enabling the parking space to function as an energy charging station as well.

Optionally, at step 310, the method 300 comprises assisting the user in planning their journey using public transportation available in the area after parking the vehicle in the reserved parking space. That is, upon parking the vehicle at the reserved parking space or while exiting the parking space, the method 300 further comprises assisting the user to plan their journey using the available public transportation.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for managing parking of vehicles comprising:

a user application configured to allow a user to search for a plurality of parking spaces in an area and reserve a parking space for a vehicle based on a selectable criteria; and a remotely operable device, installed at the parking space, configured to communicate with an access controller connected to a barrier to restrict unauthorised access to the parking space, wherein the user application is further configured to allow the user to remotely control the barrier upon successful booking and payment related to the parking space, wherein the remotely operable device is further configured to:

receive a command to open the barrier from the user application;

verify the user; and upon successful verification of the user, transmit a control signal to the access controller to open the barrier so that the vehicle can be parked at the reserved parking space; or authenticate the user; and upon successful authentication of the user, transmit a control signal to the access controller to open the barrier so that the vehicle can be parked at the reserved parking space, wherein the remotely operable device is further configured to establish a wireless local area network that can be detected by the user application and receive the command from the user application via the wireless local area network without requiring connection to a remote server.

2. The system of claim 1, further comprising an electric energy meter associated with an electric charging point provided at the parking space, wherein the electric energy meter is configured to communicate with at least one of the remotely operable device, the user application, and the remote server to allow the user to charge the vehicle while it is parked at the reserved parking space.

3. The system of claim 2, wherein the user application is further configured to track parking usage and charge the user for the parking space and/or for using the electric charging point at the parking space.

4. The system of claim 2, wherein the remotely operable device and the electric energy meter are configured to communicate with the user application and other devices in the system via one or more of a wired connection, Wi-Fi, 2G, 3G, 4G, 5G mobile networks, and Zigbee connection.

5. The system of claim 1, further comprising one or more sensors installed at the parking space to monitor the vehicles accessing the parking space.

6. The system of claim 5, wherein the one or more sensors comprises a motion detector, an infrared reflectance sensor, and a magnetometer.

7. The system of claim 1, further comprising one or more cameras installed at the parking space to capture information such as vehicle type, model, colour, license plate number of the vehicle entering the parking space, and to track people entering and exiting the parking space.

8. The system of claim 1, wherein the user application is further configured to allow owners of the plurality of parking spaces to list their available parking spaces to be reserved by other users searching for parking spaces through the user application.

9. The system of claim 1, wherein the user application further comprises information regarding public transportation in the area and is configured to assist the user in planning their journey using the public transportation after parking the vehicle at the reserved parking space.

10. The system of claim 1, further comprising one or more modules configured to enable autonomous parking of the vehicles.

11. A method of managing parking of vehicles comprising the steps of:

allowing a user to search for a plurality of parking spaces in an area and reserving a parking space to park a vehicle based on a selectable criteria;

allowing the user, via a user application, to remotely control a barrier at the parking space upon successful booking and payment related to the parking space;

receiving, at a remotely operable device installed at the parking space and in communication with an access controller connected to the barrier, a command to open the barrier from the user application;

verifying the user at the remotely operable device; and upon successful verification of the user, transmitting a control signal from the remotely operable device to the access controller to open the barrier; or authenticating the user at the remotely operable device; and upon successful authentication of the user, transmitting a control signal from the remotely operable device to the access controller to open the barrier, wherein the remotely operable device is further configured to establish a wireless local area network that can be detected by the user application and receive the command from the user application via the wireless local area network without requiring connection to a remote server.

12. The method of claim 11, further comprising allowing the user to charge the vehicle using an electric charging point provided at the parking space.

13. The method of claim 11, further comprising assisting the user in planning their journey using public transportation available in the area after parking the vehicle in the reserved parking space.

14. A non-transitory computer-readable storage medium comprising instructions which, when executed by a computer, cause the computer to carry out the steps of the method of claim 11.

* * * * *